United States Patent
Schmitz

(10) Patent No.: US 7,165,893 B2
(45) Date of Patent: Jan. 23, 2007

(54) MULTI-FIBER OPTICAL CONNECT

(75) Inventor: Roger W. Schmitz, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 146 days.

(21) Appl. No.: 10/939,071

(22) Filed: Sep. 10, 2004

(65) Prior Publication Data

US 2006/0056770 A1    Mar. 16, 2006

(51) Int. Cl.
    *G02B 6/38* (2006.01)
(52) U.S. Cl. .......................... 385/55; 385/53; 385/56; 385/58
(58) Field of Classification Search ............... None
    See application file for complete search history.

(56) References Cited

U.S. PATENT DOCUMENTS

| | | | |
|---|---|---|---|
| 4,056,305 A | 11/1977 | McCartney et al. | |
| 4,258,977 A | 3/1981 | Lukas et al. | 350/96.21 |
| 4,575,183 A | 3/1986 | Parchet et al. | 350/96.22 |
| 4,595,839 A | 6/1986 | Braun et al. | 250/551 |
| 4,657,338 A | 4/1987 | Khoe et al. | 350/96.21 |
| 4,696,692 A | 9/1987 | Schmitt | 65/102 |
| 4,712,864 A | 12/1987 | Ellis et al. | 350/96.22 |
| 5,179,609 A | 1/1993 | Blonder et al. | 385/89 |
| 5,283,848 A | 2/1994 | Abendschein et al. | 385/59 |
| 5,598,494 A | 1/1997 | Behrmann et al. | 385/59 |
| 6,118,917 A | 9/2000 | Lee et al. | 385/49 |
| 6,305,849 B1 | 10/2001 | Roehrs et al. | 385/59 |
| 6,394,661 B1 | 5/2002 | Cull et al. | 385/59 |
| 6,520,686 B1 | 2/2003 | Kiani | 385/54 |
| 6,674,585 B1 | 1/2004 | Calvet et al. | 359/822 |
| 6,827,597 B1 * | 12/2004 | Metzbower et al. | 439/320 |
| 6,863,452 B1 * | 3/2005 | Takada | 385/93 |
| 2002/0029898 A1 * | 3/2002 | Zink et al. | 174/138 R |
| 2005/0094416 A1 | 5/2005 | Schmitz | 362/551 |

FOREIGN PATENT DOCUMENTS

| | | |
|---|---|---|
| EP | 1 043 611 A2 | 10/2000 |
| GB | 1 526 682 | 9/1978 |
| JP | 2002-148486 | 5/2002 |
| WO | WO 94/10593 | 4/1994 |

* cited by examiner

*Primary Examiner*—Frank G. Font
*Assistant Examiner*—Eric Wong
(74) *Attorney, Agent, or Firm*—Faegre & Benson, LLP

(57) ABSTRACT

An optical connector comprises a first block having a channel for accommodating a first set of optical cables and a second block having a channel for accommodating a second set of optical cables. Each block has three protrusions, each adapted to be engaged to a respective one of the three protrusions from the other block in an end-to-end fashion and having a channel for accommodating one of the optical cables. The connector further comprises a spring biasing the two blocks to maintain the end-to-end engagement a longitudinal direction between the protrusions three spacers. The connector also includes limiter disk having three slots arranged in a Y-pattern, each slot width-wise closely fitting an opposing pair of the protrusions. The limiter disk thus constrains the relative shifting or rotation between the two blocks in any direction transverse to the longitudinal direction. The connector further includes a fastener attached to the two blocks for securing the two blocks together. A kinematic support is thus provided for stable optical connection across an optical connector.

27 Claims, 17 Drawing Sheets

MULTI-FIBER OPTICAL CONNECT

FIELD OF THE INVENTION

The invention relates generally to fiber optical systems. More particularly, the invention relates to an optical connector and method for reliably connecting optical fibers.

BACKGROUND OF THE INVENTION

Optical connectors are important components in fiber optical systems. Stable, intimate contacts between optical cables are crucial for reliable transmission of signals across the connection. The ability of two cable ends that are to be secured together by a connector to move relative to one another is often characterized by the degrees-of-freedom one end has relative to another. A cable end totally unconstrained relative to another has six degrees-of-freedom, which are often expressed in terms of three translational and three rotational coordinates. Ideally, the ends being connected have no degree-of-freedom relative to each other.

Optical cables are typically spliced in an end-to-end fashion. The connectors typically are designed to hold the opposing ends of optical cables to be spliced in compressive stress when the cables are connected. Typically in the prior art, to achieve stable contact between the ends of the optical cables, the ends of the cables and the areas surrounding the ends are made planar. However, any unevenness in the planar surfaces or contaminant particles, which may be introduced during the process of splicing the cables, will tend to give the connected cable end added degrees-of-freedom, i.e., to permit the ends to tilt relative to one another. The added degrees-of-freedom is generally undesirable for both optical connections that are relatively immobile (such as those for buried optical cables) and those that tend to be flexed or moved often (such as those connecting handheld optical probes to base stations). However, it is particularly undesirable for the latter as the movement of the connections will more likely expose the connector to impact and cause the connected cable ends to rock or shift relative to one another when the connector is moved.

The invention disclosed herein is aimed at providing a method and device for establishing reliable connection between optical cables, substantially without the drawbacks of the conventional approaches.

SUMMARY OF THE INVENTION

Generally, the invention provides a stable contact between two halves of an optical connector by employing an essentially kinematic engagement between the two. The essentially kinematic engagement is formed by maintaining a three-footed contact between the two halves of the connector in a longitudinal direction and constraining the relative shifting and rotation between the two in directions transverse to the longitudinal direction. More specifically, an optical connector according to the invention comprises a first block have a channel for accommodating a first optical cable; a second block have a channel for accommodating a second optical cable; three spacers, each positioned between the first and second blocks and engaging both blocks when the blocks are pressed against each other by a biasing force in a first (longitudinal) direction, the three spacers being positioned and adapted to balance substantially the entire biasing force; and a plurality of limiters arranged to constrain relative motion between any portion of the first block and any portion of the second block in all directions transverse to the first direction. In one embodiment each of the three spacers comprises a protrusion extending from either one of the first and second blocks and adapted to be engaged to the other one of the first and second blocks when the blocks are pressed against each other by the biasing force in the first direction. The limiters in one embodiment comprise slots for receiving the protrusions, the slots being arranged in a Y-pattern to prevent substantial movement of one of the blocks relative to the other in directions transverse to the longitudinal direction. The optical cables run through some or all of the three spacers (or protrusions), which are secured to the optical cables.

A connector according to the invention can also including a resilient member, such as a spring for providing a biasing force engaging the first block to the second block. The connector also includes a fastener having a first portion attached to the first block and a second portion attached to the second portion, the two portions being adapted to be connected to each other to maintain the biasing force engaging the two blocks to each other. The fastener in embodiment comprises a first shell adapted to house the first block and a second shell adapted to house the second block. The two shells are coupled together with a bayonet (pin-and-slot) mechanism.

In another embodiment, an optical connector further has a space for receiving an electrical device, such as an integrated-circuit chip, having a conductive terminal, and further comprises an electrode, such as a spring-loaded pin adapted to be in electrical contact with the conductive terminal when the two blocks are engaged to each other.

According to another aspect of the invention, an optical system comprises optical cables coupled together with a connector described above.

The invention further provide an optical device, such as an optical probe designed to be detachably connected to a base station, that includes and optical head, the device-side portion of an optical connector described above and an optical cable linking the optical head and the device-side portion of an optical connector. The device-side portion of the connector can further include a cavity for receiving an electrical device.

The invention also provides a method for coupling optical cables, the method comprising securing a first optical cable to a first block; securing a second optical cable to a second block; biasing the first block against the second block in a longitudinal direction at three locations while engaging an end of the first optical cable to an end of the second optical cable in one of the three locations; and constraining the relative movement between the first and second blocks in directions transverse to the longitudinal direction.

BRIEF DESCRIPTION OF THE DRAWINGS

Other objects and advantages of the invention will become apparent upon reading the following detailed description and upon reference to the drawings in which.

DETAILED DESCRIPTION OF SPECIFIC EMBODIMENTS

Figure 1:
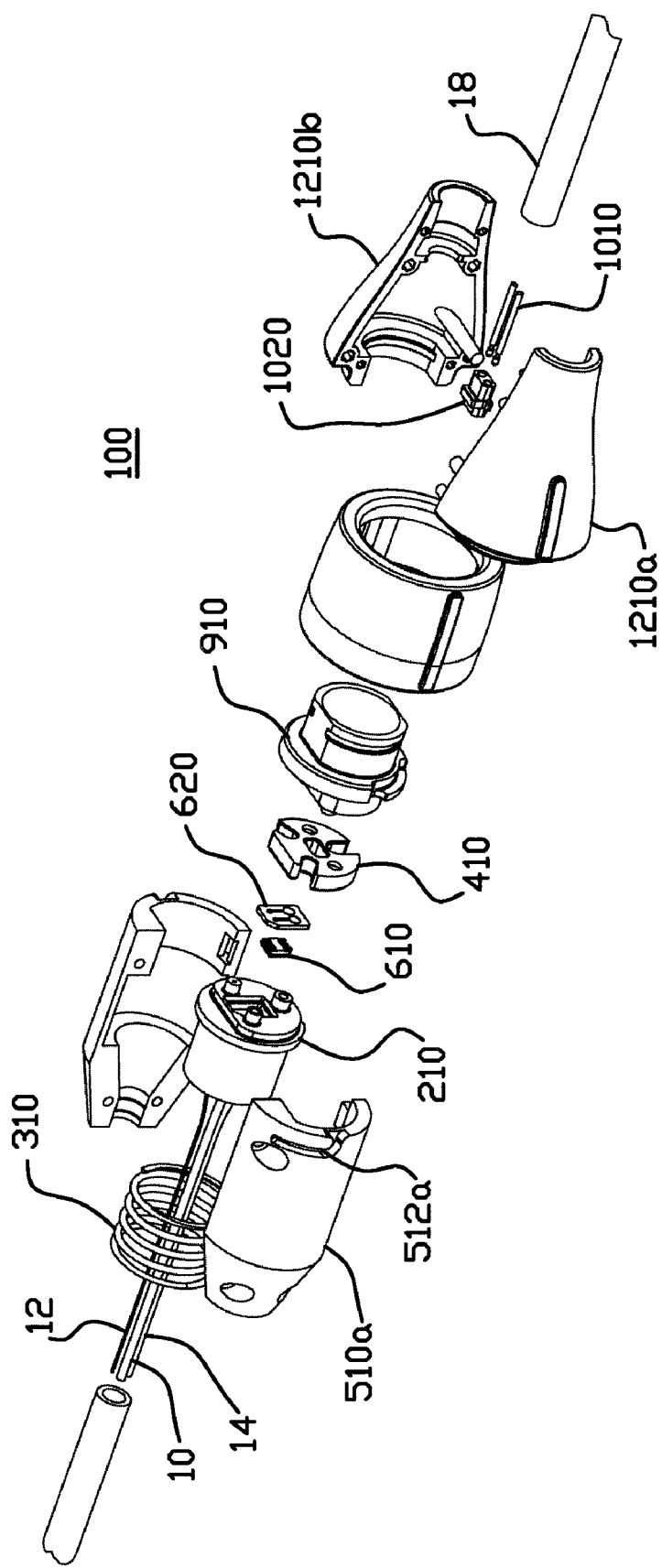
FIG. 1 is an exploded view of a connector according to an aspect of the invention.
Figure 2:
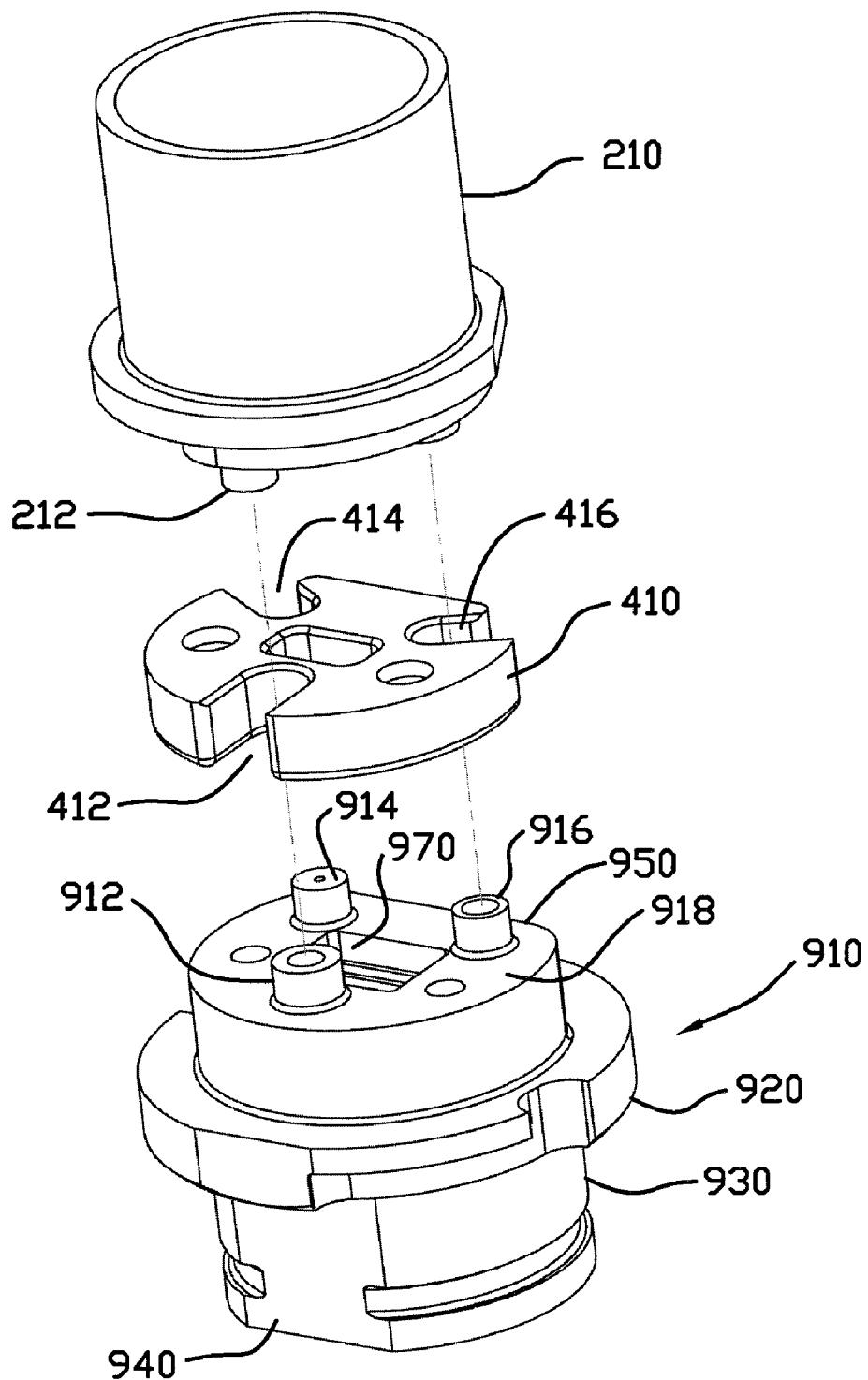
FIG. 2 is a more detailed view of the blocks and disk inside the connector shown in FIG. 1.
Figure 3:
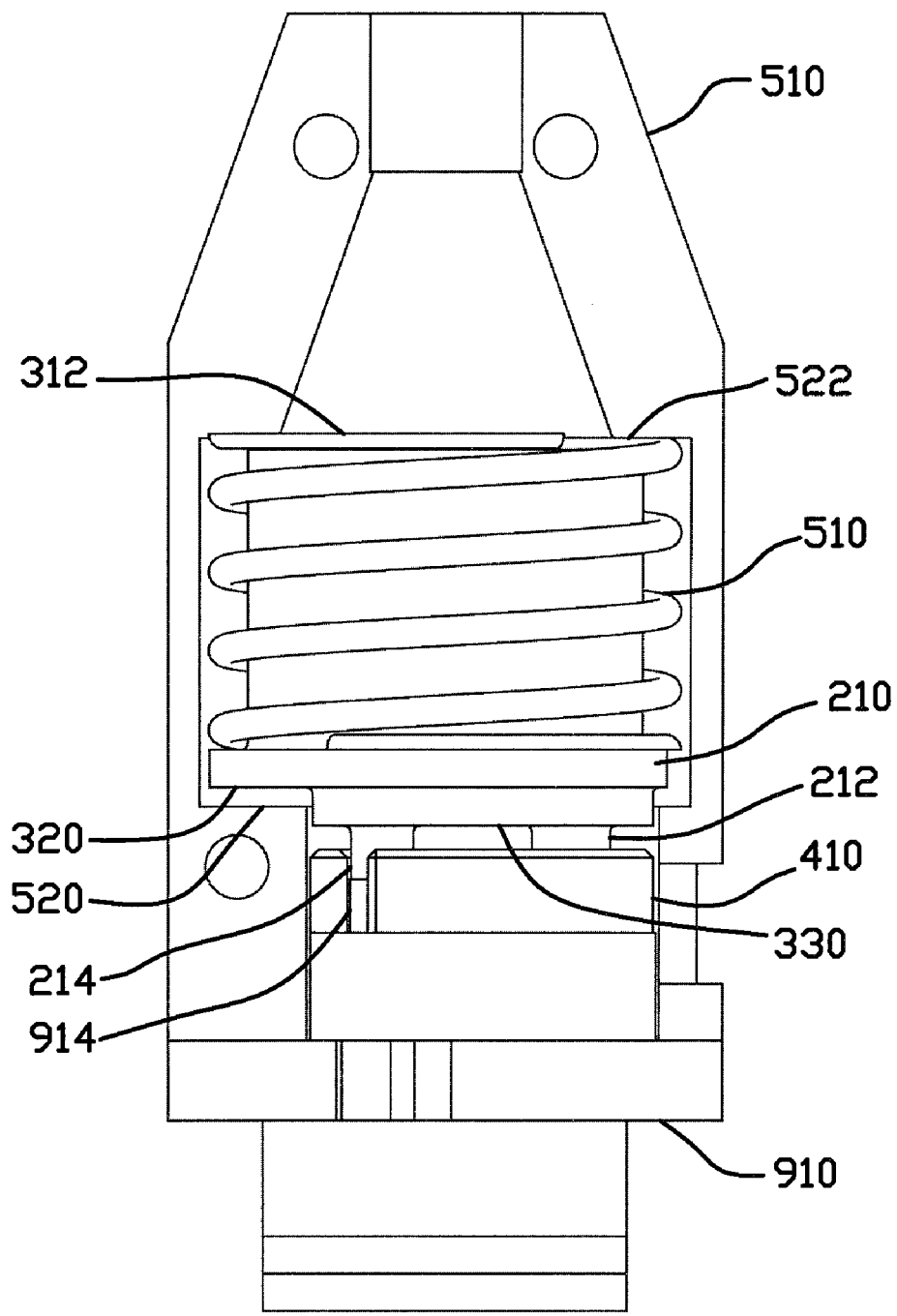
FIG. 3 shows the component in FIG. 2 in their assembled and connected state, with the probe-side block shown as seated in the biasing spring and outer shell.
Figure 4:
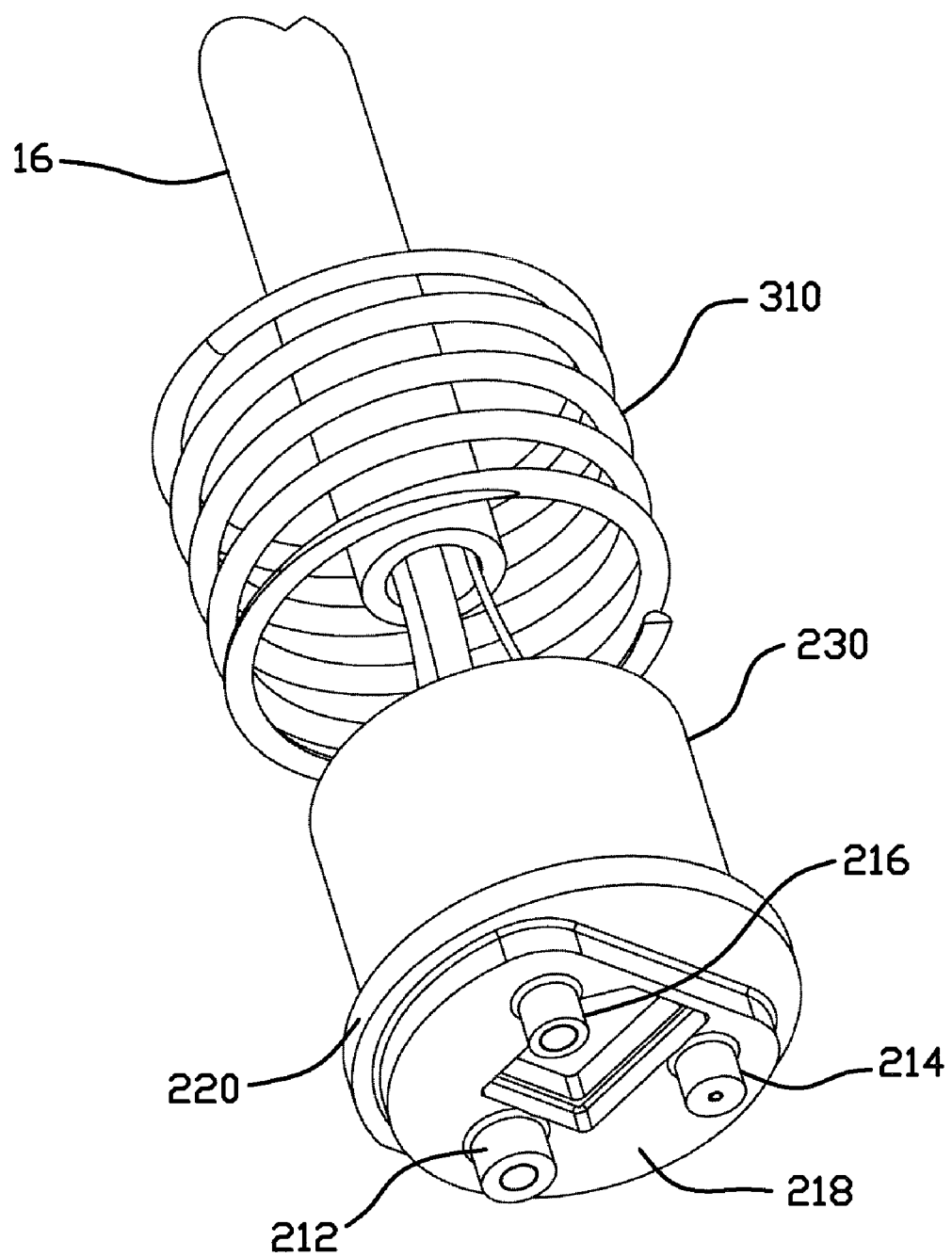
FIG. 4 shows the probe-side block with optical cables secured therein, and the biasing spring.
Figure 5:
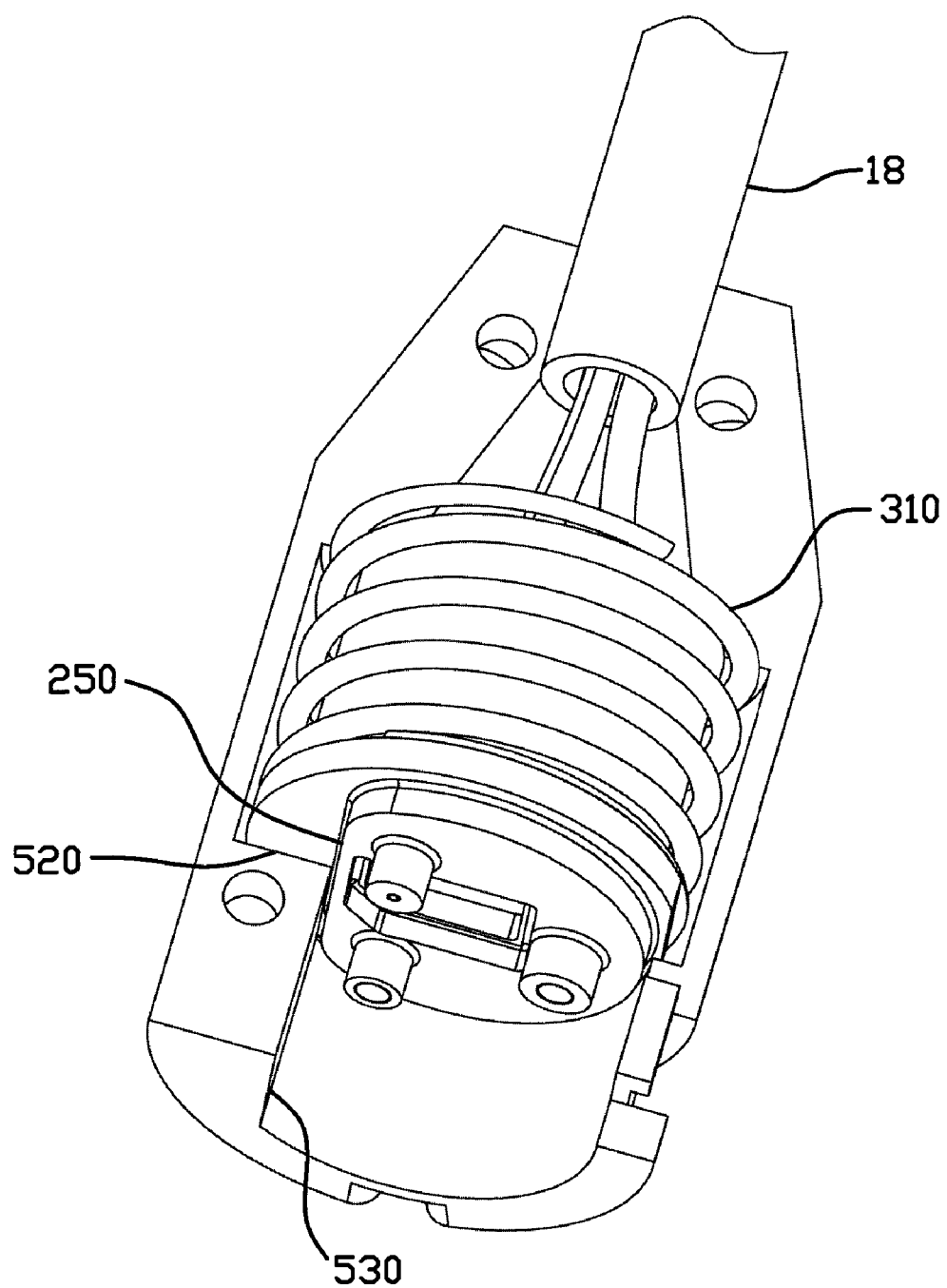
FIG. 5 shows the components in FIG. 5 in there assembled state in a portion of the outer shell.

Referring to FIG. 1, an illustrative embodiment of the invention is a connector 100 for connecting a first set of optical cables 10, 12 and 14 (see also FIG. 4) to a second set of three optical cables (not shown). Each set is enclosed in a protective shield (16 and 18, respectively). The first set of cables extend from the connector 100 to an end optical device (not shown), such as a handheld optical probe for measuring the spectral response characteristics of the subject of investigation (e.g., human tissues). An example of such a probe is disclosed U.S. patent application Ser. No. 10/698,751, which is commonly owned with the present application and is incorporated herein by reference. Each optical cable carries a desired number of individual optical fibers. For example, optical cable 10 is an input optical cable for transmitting light of different wavelengths to an optical emitter in the probe and includes a number of (e.g., four) optical fiber bundles 0.75 mm in diameter, each bundle to carry light of a different wavelength. Each bundle includes a number of optical fibers 50 μm in diameter. Optical cables 12 and 14 are, respectively, received-signal cable for collecting emitted light transmitted through the tissues and reference-signal cable for directly collecting emitted light. Each of cables 12 and 14 in this example includes an optical fiber 400 μm in diameter.

The second set of optical cable extend from the connector 100 to a base station, which provides any optical and electrical power supplied to the probe and performs signal processing and analysis functions.

The connector 100 includes the following components: a first block 210 on the probe side; a second block 910 on the station side; a spring 310 as a resilient biasing member engaging the first block 210 to the second 910 in a longitudinal direction 110; a limiter disk 410 for constraining the relative motion between the first and second blocks in any direction transverse to the longitudinal direction 110; an integrated-circuit chip 610 and its mounting board 620 to be positioned in the first block 210; spring-loaded conductive pins 1010 and their holder 1020 to be positioned in the second block 910; a probe-side shell 510 (in two halves 510a, 510b) for receiving the first block 210 and spring 310; a station-side shell 1210 (in two halves 1210a, 1210b) for receiving the second block 910; and a retainer nut (or probe-side-engaging nut) 1220, which in cooperation with the probe-side shell, maintains the engagement between the first and second blocks.

Figure 17:
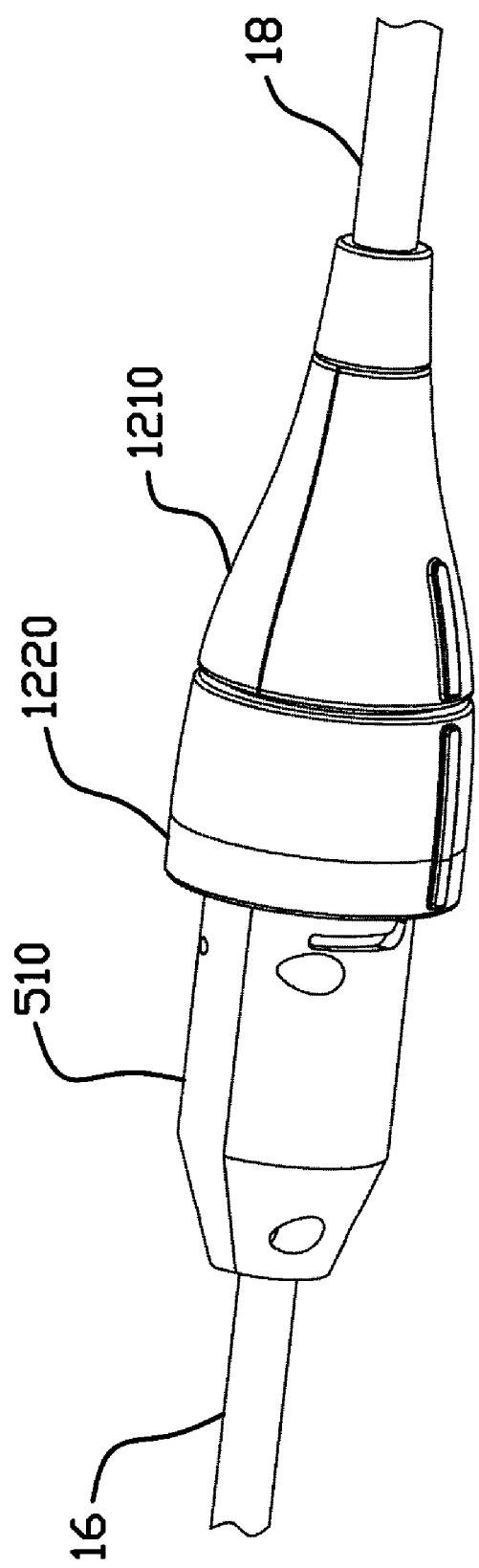
FIG. 17 shows the connector shown in FIG. 1 in fully assembled and engaged state.

FIG. 17 shows the connector 100 in its fully assembled and connected state.

Referring further to FIGS. 2–5, reliable and stable connection between optical cables are provided by an essentially kinematic engagement, i.e., a combination of three-footed contact to prevent significant rocking motion between the blocks 210, 910 and a limiter to prevent significant shift or rotation between the two blocks 210, 910. The probe-side block 210 has three cylindrical protrusions 212, 214 and 216 on the portion 218 that faces the station-side block 910; similarly, the station-side block 910 has three cylindrical protrusions 912, 914 and 916 on the portion 918 that faces the probe-side block 910. A three-footed contact is established by pair-wise engagement of the protrusions 212, 214 and 216 to the protrusions 912, 914 and 916, respectively. Each protrusion includes an opening to accommodate and hold the end portion of its respective optical cable. Thus, for example, the protrusion 212 holds the end of the input optical cable 10, and the protrusions 214 and 216 hold (e.g., by an adhesive) the ends of the received signal cable 12 and reference-signal cable 14, respectively. The cables held by the station-side block 910 are arranged in a corresponding configuration. The ends of the protrusions 212, 214 and 216, together with the respective optical cables secured in the protrusions, are polished so that they are smooth and coplanar. Likewise, the ends of the protrusions 912, 914 and 916, together with the respective optical cables secured in the protrusions, are polished so that they are smooth and coplanar.

The main body of the probe-side block 210 comprises longitudinally three coaxial, cylindrical or truncated cylindrical (solid or otherwise) sections 218, 220 and 230, the axis of a truncated cylindrical section being defined as that of an imaginary cylindrical section without truncation. The centers of the protrusions 212, 214 and 216 in this illustrative embodiment are positioned through the apexes of an equilateral triangle centered on the common axis of the main body. Similarly, the main body of the station-side block 910 comprises longitudinally three coaxial, cylindrical or truncated cylindrical sections 918, 920 and 930. The planar side surfaces in the truncated cylindrical sections (e.g., surfaces 250, 940 and 950) are designed to prevent rotation of either block relative to the shells 510 and 1210. The middle section 220 is a flange, which the biasing spring 310 engages to push the first block 210 towards the second block 910, and which acts as a stop, retaining the first blocks 210 in the shell 510 when the first block 210 is detached from the second block 910. The middle section 920 is a flange, which the retainer nut 1220 engages to push the second block 910 towards the first block 910.

The centers of the protrusions 912, 914 and 916 in this illustrative embodiment are positioned through the apexes of an equilateral triangle centered on the common axis of the main body. Such a symmetrical configuration facilitates a balanced distribution of forces borne by the protrusions.

The limiter disk 410 in this illustrative embodiment has three slots 412, 414 and 416 through its thickness for accommodating the pair-wise engaged protrusions (212, 912), (214, 914) and (216, 916), respectively. The thickness of the disk 410 is greater than the tallest of the protrusions but no greater than the smallest combined height of any engaged pair of protrusions. Thus, when the two blocks 210 and 910 are pressed against each other such that the protrusions are pair-wise aligned, the protrusions are allowed to be engaged, preferably with space 330 left between the blocks 210, 910 and the disk 410. At the same time, both protrusions of any opposing pair are captured by one of the three slots 412, 414 and 416.

Each of the slots 412, 414 and 416 has a width sufficient to accommodate the pair of protrusions intended to be position in that slot. The width, however, is not substantially greater than the diameter of the protrusions. That is, the width is not greater than the diameter of the protrusions by more than an amount of relative shift allowable between the opposing ends of the optical cables for adequate optical signal transmission across the interface between the ends of the optical cables. Preferably, the protrusions fit exactly in their respective slots within the manufacturing tolerances of the relevant parts. The slots 412, 414 and 416 are further arranged in a Y-pattern. Thus, when the protrusions from the two blocks 210 and 910 are pair-wise engaged, the protrusions (and therefore the optical cables) are constrained in directions transverse to the longitudinal direction 110. That is, the protrusions, and therefore the optical cables, are not allowed to move a significant amount (again, defined as more than the amount of relative shift allowable between the opposing ends of the optical cables for adequate optical signal transmission across the interface between the ends of the optical cables) relative to each other in any direction transverse to the longitudinal direction 110.

An essentially kinematic engagement is thus formed. The finite contact areas between the polished ends of the protrusions and the manufacturing tolerances in the fit between the protrusions and the slots in the limiter disk results in a deviation from an ideal kinematic engagement. However, the small contact areas between the opposing ends of the protrusions and the limiter disk ensures a good approximation of an ideal kinematic engagement.

The spring 310 is slipped over the tail portion 230 of the probe-side block 210. The probe-side shell 510 comprises retaining surfaces 520 and 522 for catching the flange portion 220 and the tail end 312 of the spring 310, respectively. When the spring 310 and block 210 are received by the shell 510, the spring 310 is compressed between the flange portion 220 and the retaining surface 522, thereby exerting a biasing force on the block 210. When the connector 100 is in its disconnected state, the retaining surface 520 stops the flange portion 220, thereby preventing the block 210 from falling out of the shell 510. When the connector 100 is in its connected state, the probe-side block 210 is displaced toward the spring 310 by a small distance 320 by the station-side block 910. The protrusions (212, 912), (214, 914) and (216, 916) are thus maintained in pair-wise engagement by the biasing force provided by the biasing spring 310.

One of the advantages that the spring 310 provides is that a significant amount of deformation of external portions of the connector 100 is allowed while the intimate contacts between the ends of the opposing optical cables are maintained by the spring 310. This feature allows the wider use of softer, and often more economical, materials, such as certain plastics, in portions of the connector 100 without compromising the integrity of the optical connections between optical cables. It also allows certain portions of the connector 100 be made with less precision than would otherwise be required without compromising the optical connections. The use of such materials makes certain application more feasible. For example, in applications such as medical examinations, it may be desirable to use disposable optical probes. Using plastic materials for certain portions, such as the block 210, shell 510 and spring 310, on the probe side of the connector 100, serves to make the probes more affordable. In addition, the increased tolerance to deformation makes the connector more adapted to applications where the connector often is moved or experiences impact.

Figure 6:
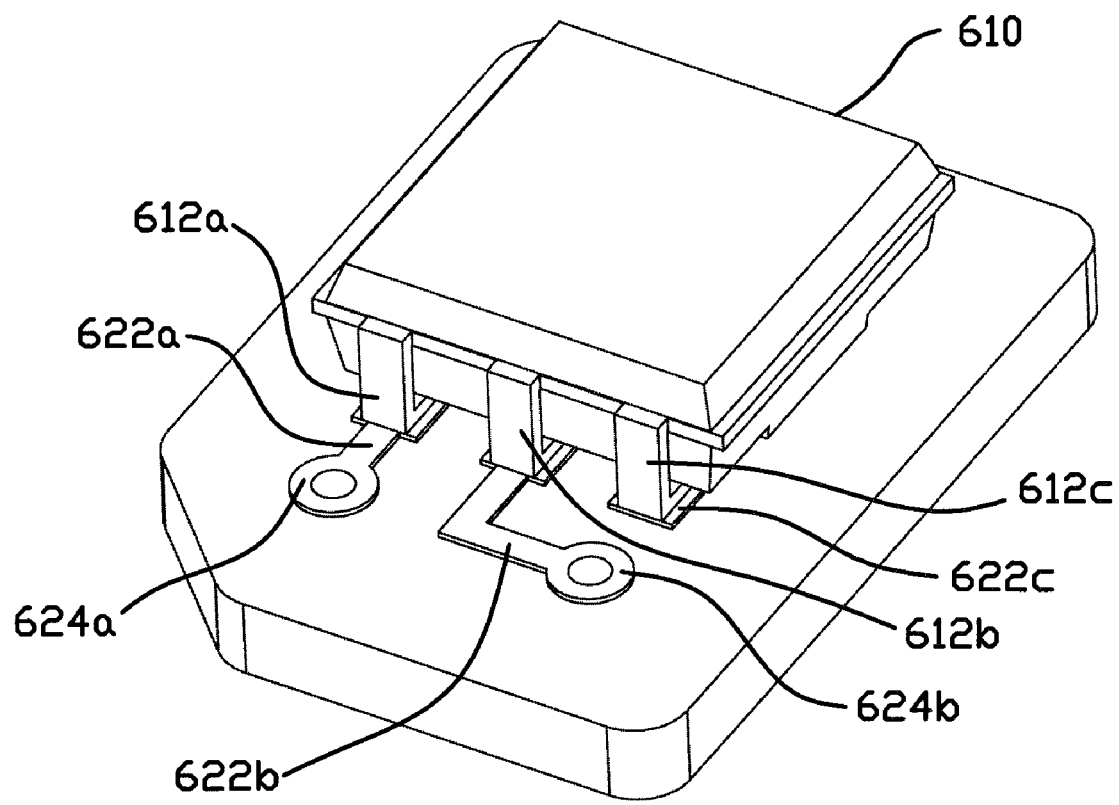
FIG. 6 shows an integrated-circuit chip mounted on a mounting board in another embodiment of the invention.
Figure 7:
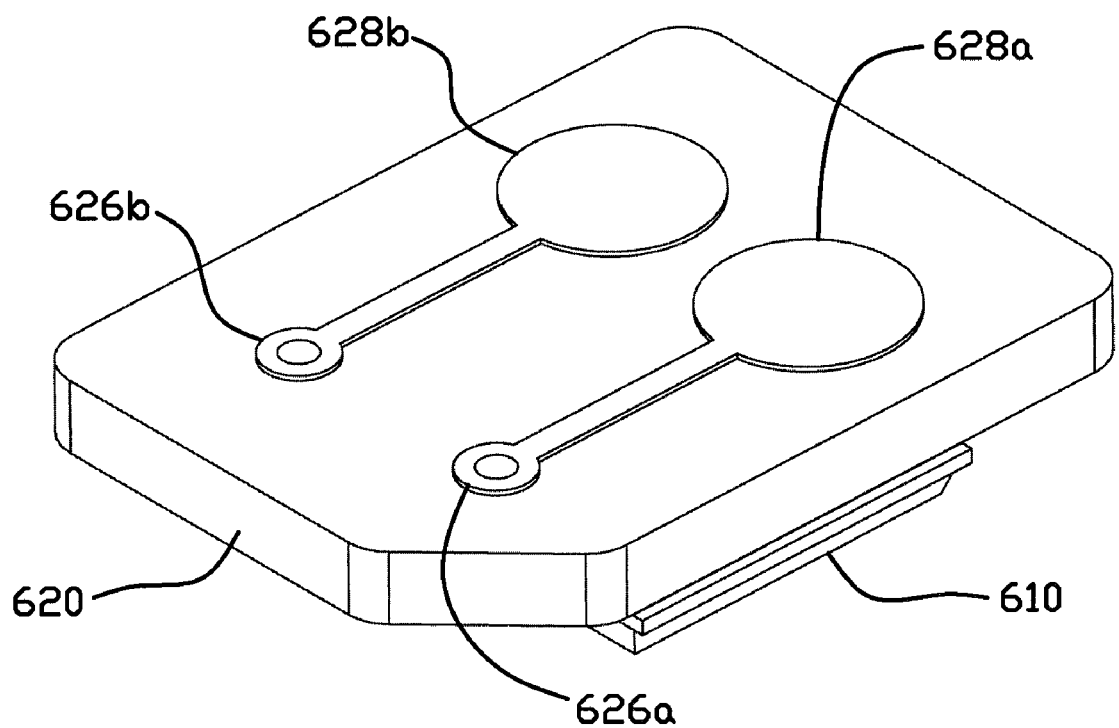
FIG. 7 shows the bottom of the assembly shown in FIG. 6.
Figure 8:
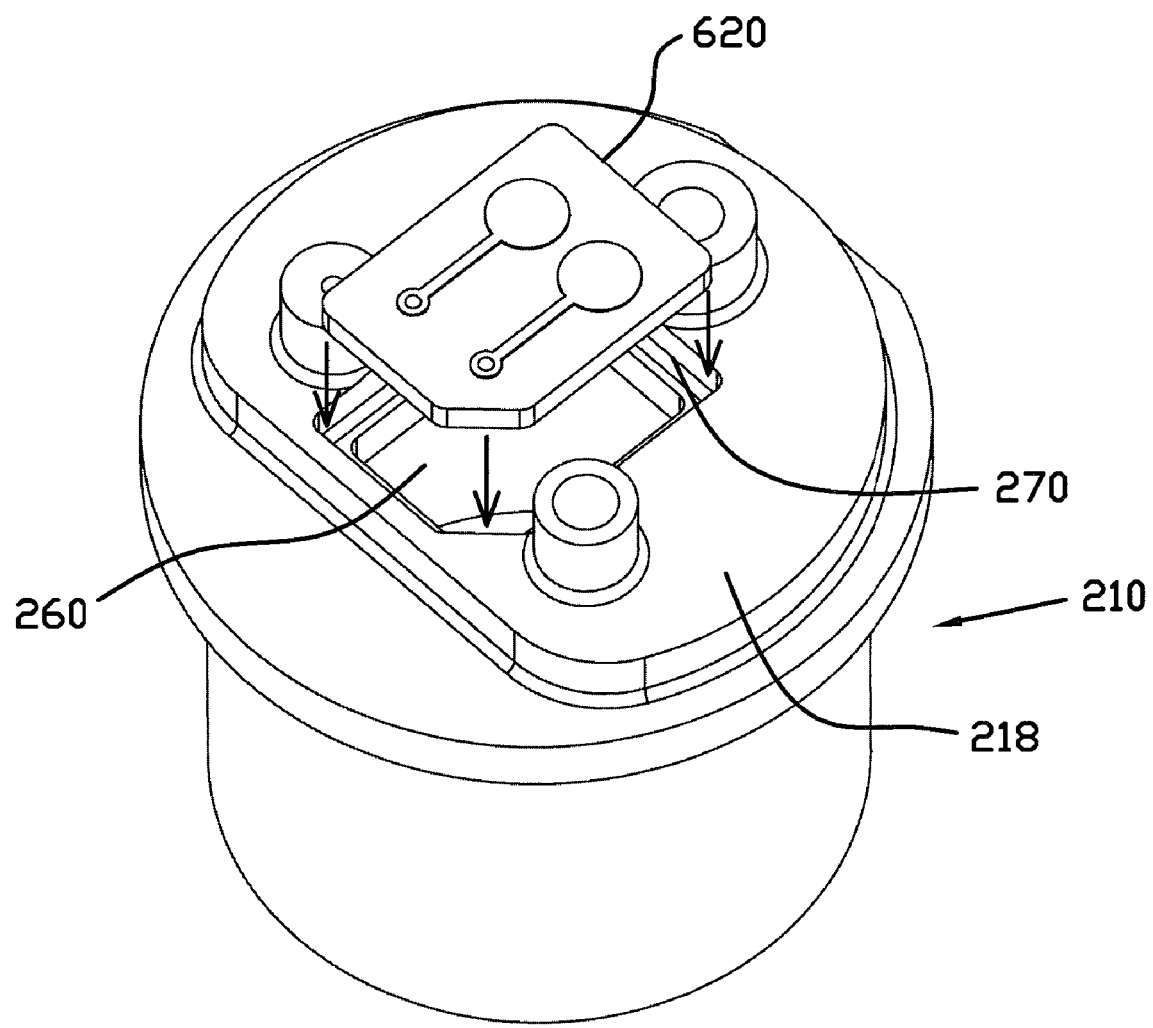
FIG. 8 shows the assembly shown in FIGS. 6 and 7 in relation to the probe-side block.

Referring in addition to FIGS. 6, 7 and 8, the connector 100 further comprises an opening 260 for receiving an electrical device, which in this example is an integrated-circuit chip 610 bonded to the top of a mounting board 620. The chip 610 has pins 612a, 612b and 612c, which are bonded (by soldering, for example) to the conductive pads 622a, 622b and 622c, respectively. At least some of the conductive pads, in this case 622a and 622b, are connected to conductive terminals, which in this case are the conductive pads 628a and 628b, respectively formed on the opposite sides of the mounting board 620 from the chip 610. The electrical connections through the board 620 are made through "vias" (metal plugs filling holes through the board 620) or, other conductive paths, between the top contact points 624a and 624b, and the bottom contact points 626a and 626b, respectively. The conductive pad 622c in this example is a dummy pad for strengthening the bonding between the chip 610 and mounting board 620 but can be of any other suitable use, such as the ground plane of the circuitry.

The chip 610 can be designed to perform a variety of function as dictated by the particular applications. In one embodiment of the invention, where the length of time period a probe has been used can be monitored, one of the pins 612a and 612b is the power line and the other data line. The chip 610 further includes a circuitry having a timing counter that begins counting after the chip has been powered up for a set period of time (e.g., two minutes). The signals from the timing counter are transmitted to the base station via a conductive pin (to be described below) in contact with the conductive pad 628a or 628b. The base station is programmed to take proper actions in response to the signals from the timing counter. In another embodiment, data obtained from probe calibration are stored in the chip 610 and available to the base station.

The electrical device in this example is placed in the opening 260 with the conductive pads 628a and 628b facing the station-side block. The opening has a step 270 along the periphery to seat the mounting board 620.

Figure 9:
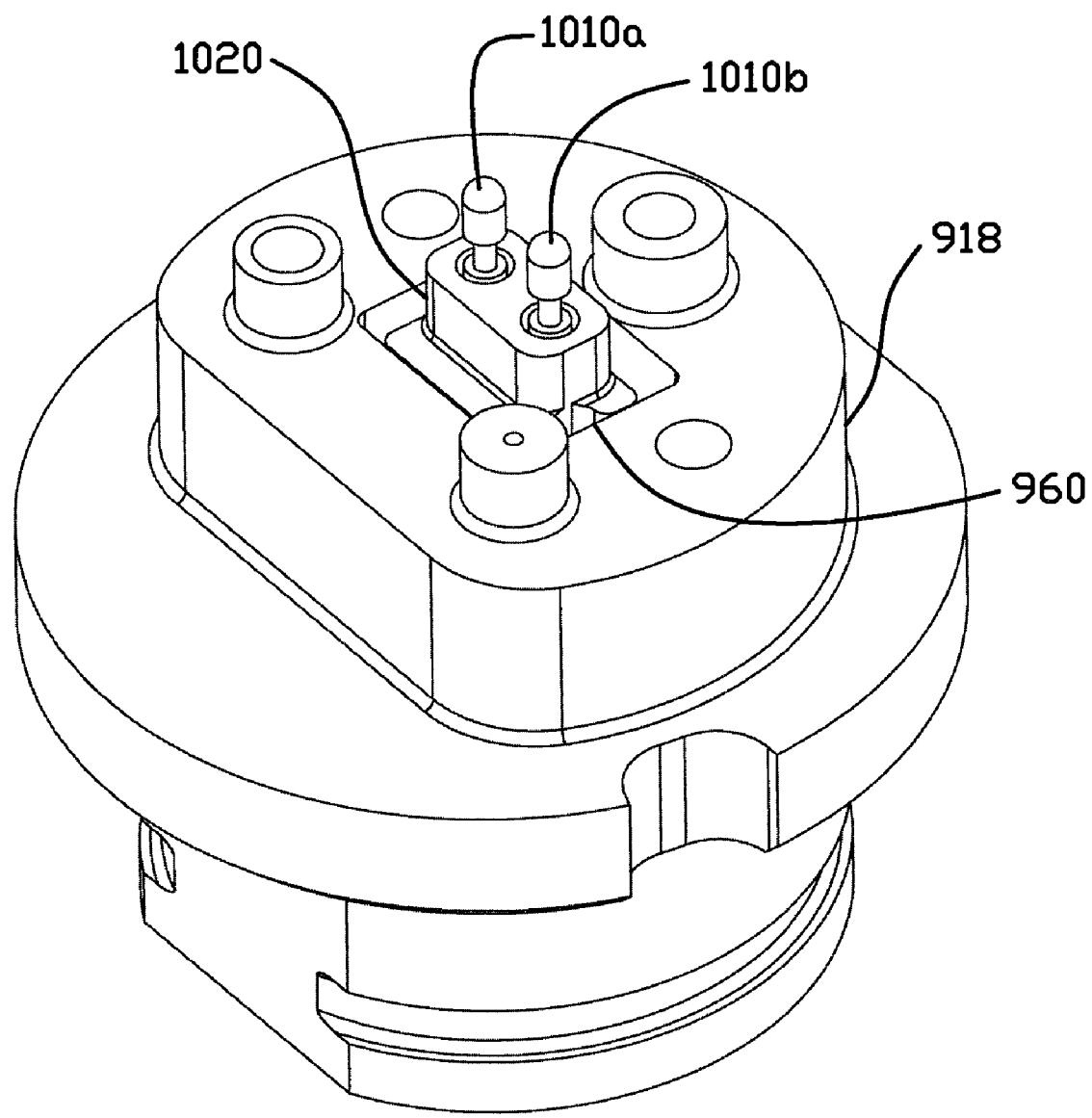
FIG. 9 shows spring-loaded pins mounted in the station-side block for making electrical connections to the assembly shown in FIGS. 6, 7 and 8.
Figure 10:
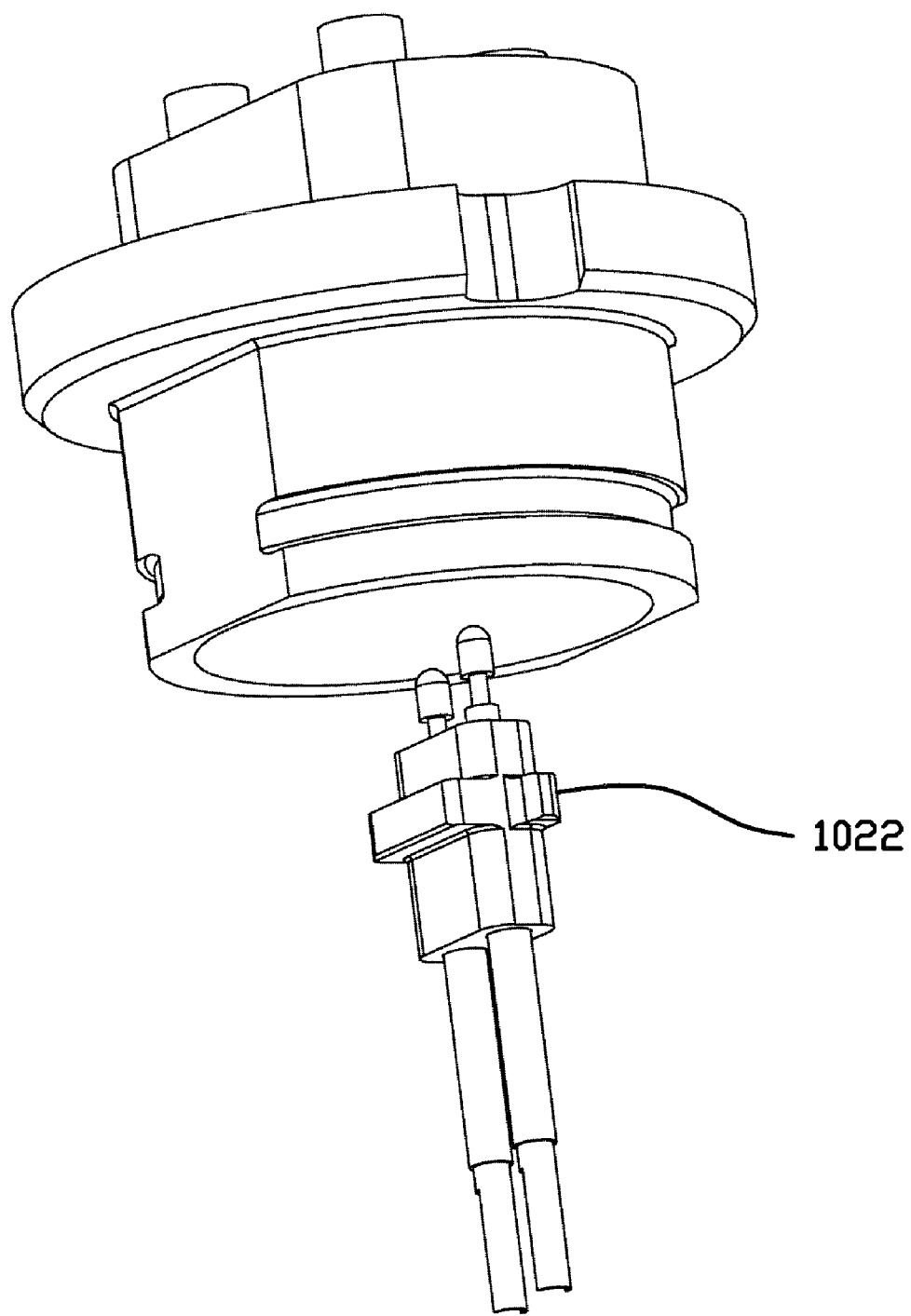
FIG. 10 shows in more detail the spring loaded pins and their holder shown in FIG. 9 and their relation to the station-side block.

Referring further to FIGS. 9 and 10, the connector 100 also comprises an opening 960 for receiving electrodes 1010a and 1010b and an electrode holder 1020. The electrodes 1010a and 1010b in this example are spring loaded electrodes, available from Everett Charles Technologies, Pomona, Calif., but can be of any suitable form, particularly of a resilient type. The holder 1020, typically made of a plastic material, has a flange portion 1022, which allows the holder 1020 to be seated in the opening 960, which has a step 970 (see FIG. 2).

Figure 11:
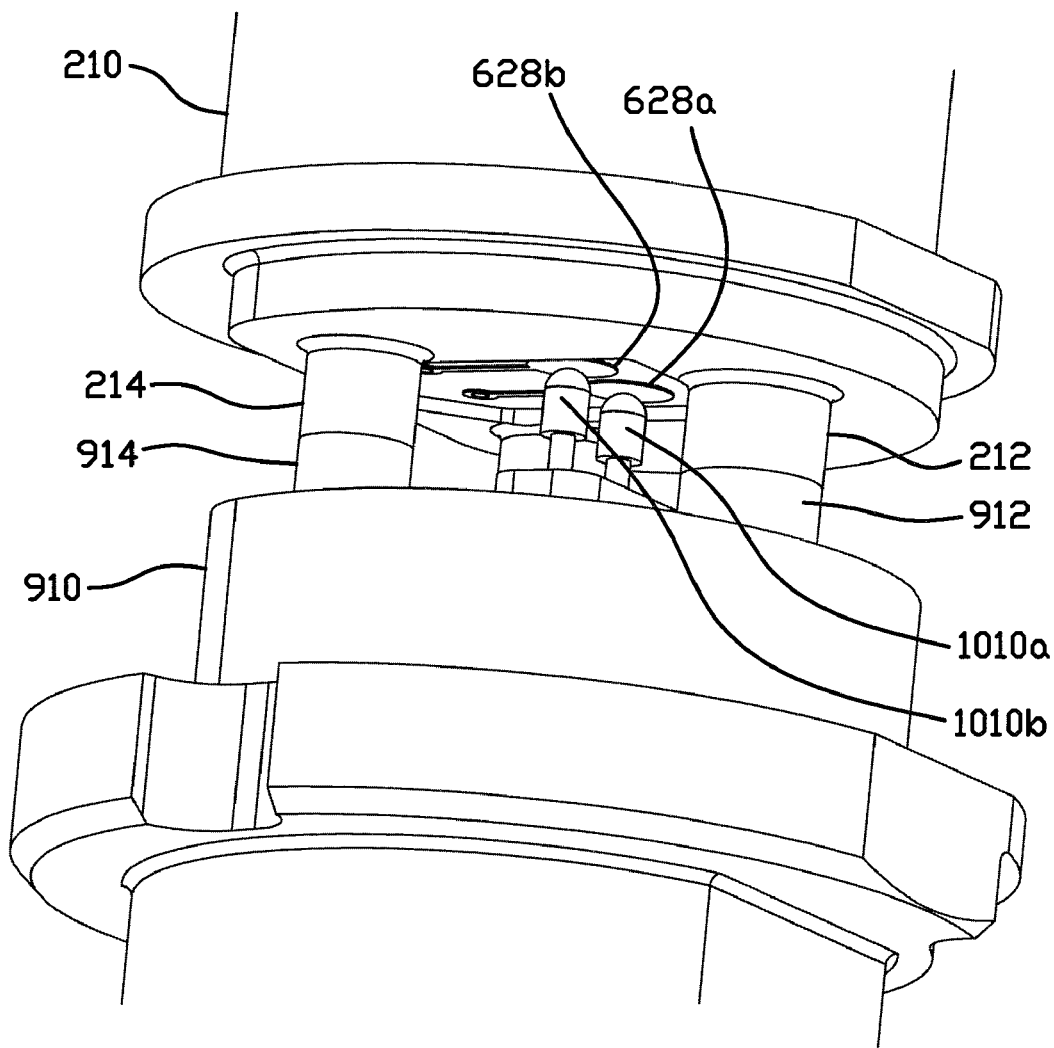
FIG. 11 shows the engaged state of the blocks and electrical components shown in the previous figures.

Thus, as shown in FIG. 11, when the blocks 210 and 910 are pressed together to pair-wise engage the protrusions and optical cables, the pins 1010a and 1010b are pushed back by, and in contact with, the conductive pads 628a and 628b, respectively.

Figure 12:
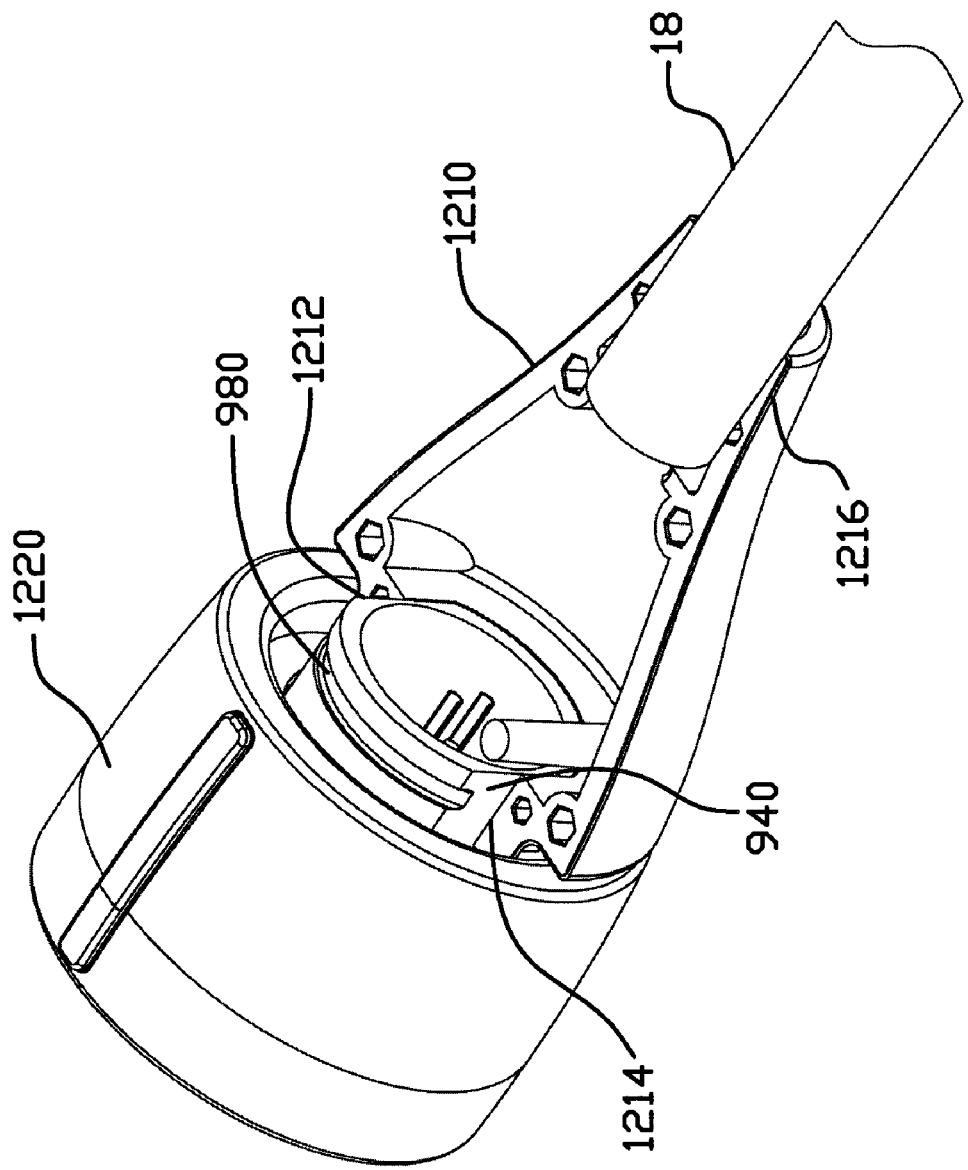
FIG. 12 shows the outer shell, comprising a probe-side-engaging nut and a strain-reliever on the station-side block.
Figure 13:
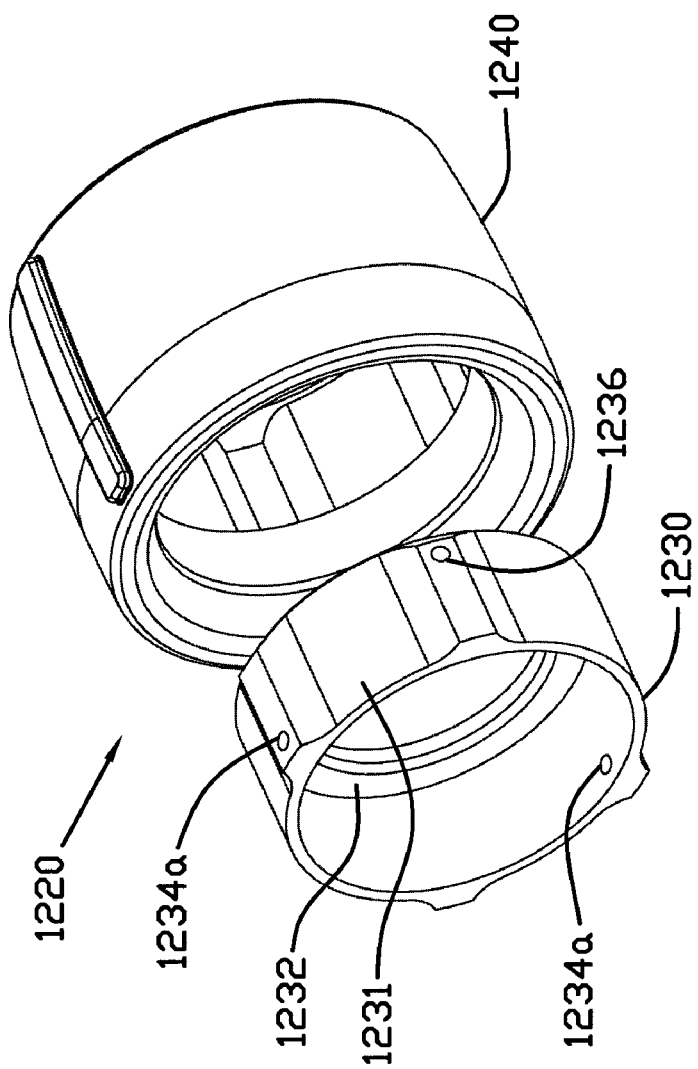
FIG. 13 shows in disassembled view the probe-side-engaging nut shown in FIG. 12.
Figure 14:
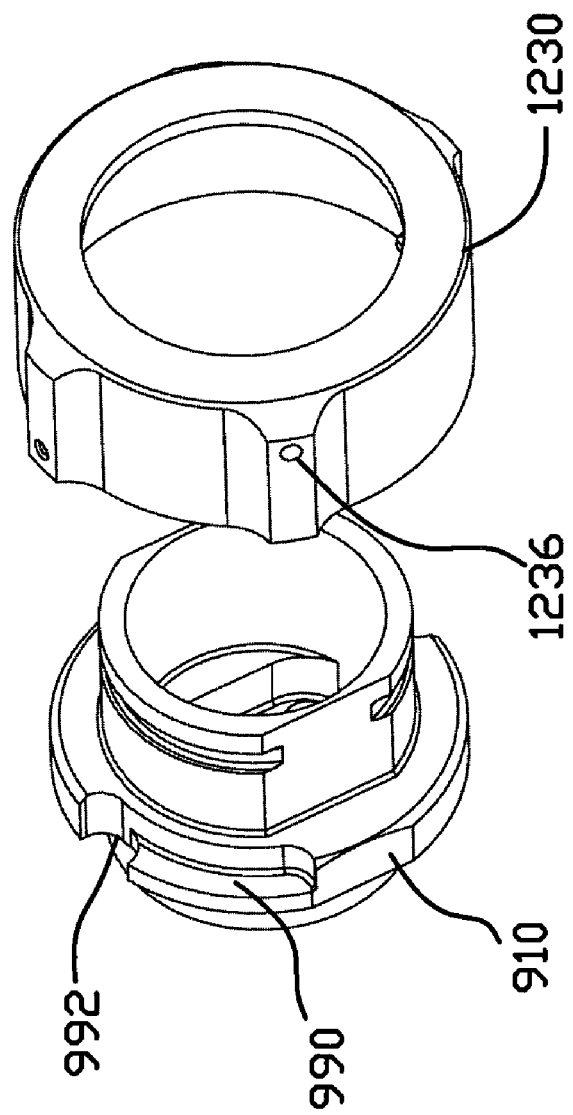
FIG. 14 shows the rigid portion of the probe-side-engaging nut shown in FIGS. 12 and 13 and its relation to the station-side block.
Figure 15:
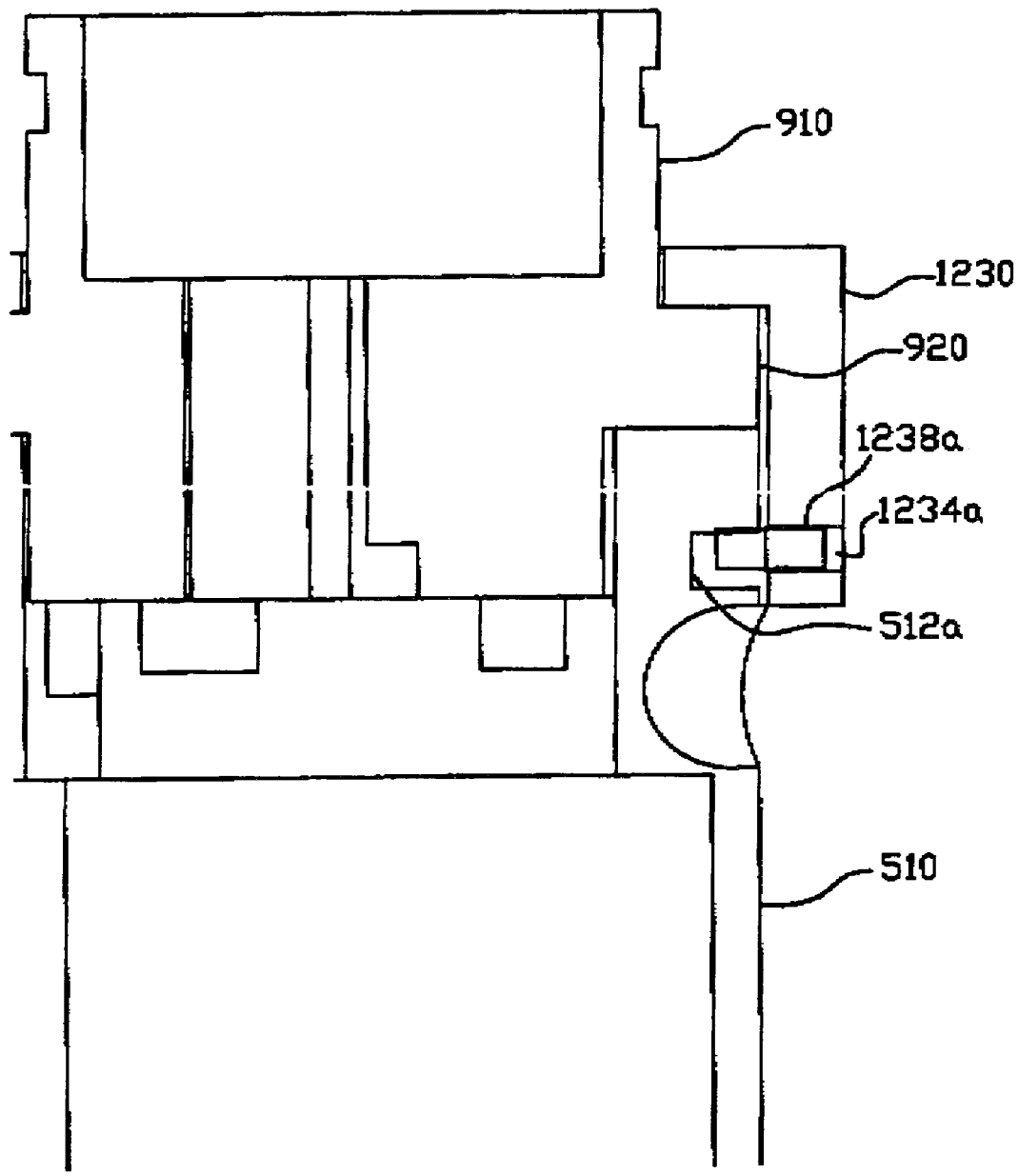
FIG. 15 shows the probe-side-engaging nut and the station-side block in engagement with the probe-side outer shell.
Figure 16:
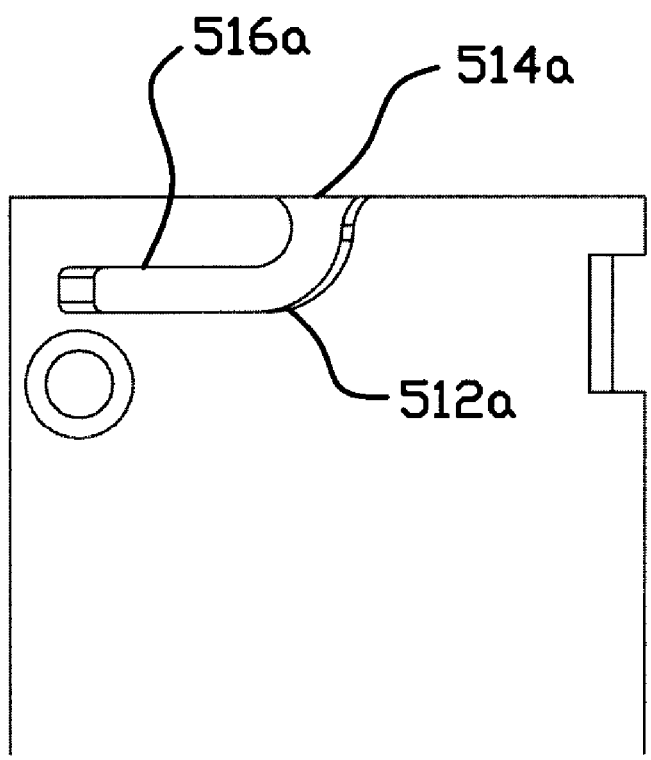
FIG. 16 shows in more detail the portion of the probe-side shell including the curved slot for receiving a pin on the probe-side-engaging nut.

Referring further to FIG. 12, the tail portion 930 of the station-side block 910 has grooves 980 on the arcuate portions of the side surface for engaging the station-side shell 1210. The station-side shell 1210 is in two halves and has inwardly protruding portions 1212 that fit in the grooves 980. The shell 1210 also has a flat inner surface portions 1214 for engaging the flat side surfaces 940 to prevent the block 910 from rotating relative to the shell 1210. The shell 1210 further comprises a strain relief portion 1216, which grips the protective shield 18 encasing the optical cables running from the connector 100 to the base station.

Referring further to FIGS. 12–16, the connector 100 further comprises a retaining nut slipped over the tail portion 930 and flange portion 920 of the station-side block 910 to engage the probe-side shell 510 in a bayonet fashion. The retaining nut 910 in the example comprises a rigid nut 1230, which can be made of a variety of suitable materials, including stainless steel, brass and hard plastics, and a cover 1240, which can be a soft plastic over-mold or any other suitable material.

The rigid nut 1230 comprises a cylindrical ring portion 1231 and a flange portion 1232 projecting inwardly from the ring portion 1231 for engaging the flange portion 920 of the station-side block 910. It also has pins 1238a, 1238b and 1237 (only 1238a is shown; see FIG. 15) mounted in the dowel holes 1234a, 1234b and 1236, respectively and protruding inward from the ring 1231. The pins can also be formed integrally with the ring portion 1231. Two pins 1238a and 1238b are positioned to engage the slots 512a and 512b (only 512a is shown), respectively, on the outside surface of the probe-side shell 510 (see FIGS. 1, 15 and 16) to lock the two halves of the connector 100 together. Each slot, using slot 512a as an example, has a longitudinal segment 514a and an essentially circumferential, slightly helical segment 516a. In operation, the pin 1238a first enters the longitudinal segment when the retaining nut 1220 is pushed longitudinally toward the probe-side half of the connector 100, against the biasing force from the biasing spring 310. When the retaining nut 1220 is then twisted, the pin 1238a travels along the essentially circumferential segment, thereby locking the two halves of the connector 100. The third pin 1237 is positioned to engage a slot 990 of a finite length on the block 910 to limit the range of rotation of the rigid nut.

Other mechanisms to for locking the two halves of the connector 100 can be used. For example, the probe-side shell 510 and retaining nut 1220 can have mating threaded portions so that the two halves of the connector 100 can be screwed together, or snap-lock mechanisms so that the two halves can be snapped together.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An optical connector, comprising:
    a first block having a channel for accommodating a first optical cable;
    a second block having a channel for accommodating a second optical cable in optical communication with the first optical cable;
    three spacers, each positioned between the first and second blocks and adapted to engage both blocks when the blocks are pressed against each other by a biasing force in a first direction, the three spacers being positioned and adapted to balance substantially the entire biasing force; and
    a plurality of limiters arranged to constrain relative motion between any portion of the first block and any portion of the second block in all directions transverse to the first direction.

2. The optical connector of claim 1, wherein the plurality of limiters are configured and arranged to constrain relative shifting and rotation between any portion of the first block and any portion of the second block in all directions transverse to the first direction.

3. The optical connector of claim 1, wherein each of the three spacers comprises a protrusion extending from either one of the first and second blocks and adapted to be engaged to the other one of the first and second blocks when the blocks are pressed against each other by the biasing force in the first direction.

4. The optical connector of claim 3, wherein each of the plurality of limiters comprises a recess formed in a solid body and adapted to retain at least a portion of one of the protrusions.

5. The optical connector of claim 3, wherein at least one of three protrusions defines an opening to accommodate the optical cable through the opening.

6. The optical connector of claim 5, wherein each of three protrusions defines an opening to accommodate the optical cable through the opening.

7. The optical connector of claim 4, wherein the three protrusions extend from the first block.

8. The optical connector of claim 7, wherein the plurality of recesses comprise three elongated slots in the second block, the three slots arranged in a Y-pattern.

9. The optical connector of claim 7, further comprising three protrusions extending from the second block, the protrusions from the second block being pair-wise aligned substantially with the protrusions on the first block along the first direction.

10. The optical connector of claim 9, further comprising a disk having a thickness and positionable between the first and second blocks when the blocks are engaged to each other, the disk defining three openings through the thickness of the disk and arranged in a Y-pattern, each opening having a width sufficient to accommodate its respective pair of protrusions extending from the first and second blocks but does not permit either protrusion to move any substantial distance relative to the disk along the width of the opening.

11. The optical connector of claim 9, wherein each of at least two of the three protrusions on each block defines an opening to accommodate the optical cable through the opening.

12. The optical connector of claim 1, further comprising a resilient member adapted to provide the biasing force engaging the first block to the second block.

13. The optical connector of claim 12, further comprising a fastener having a first portion attached to the first block and a second portion attached to the second block, the two portions being adapted to be connected to each other to maintain the biasing force engaging the two blocks to each other.

14. The optical connector of claim 13, wherein the first portion comprises a first shell adapted to house the first block, and the second portion comprises a second shell adapted to house the second block.

15. The optical connector of claim 1, the connector further defining a space for receiving an electrical device having a conductive terminal, and further comprising an electrode adapted to be in electrical contact with the conductive terminal at least when the two blocks are engaged to each other.

16. The optical connector of claim 15, wherein the electrode is a spring-loaded pin adapted to flexibly engage the conductive terminal when the two blocks are engaged to each other.

17. The optical connector of claim 15, further comprising an electrical device comprising an integrated circuit chip positioned in the space for receiving an electrical device.

18. The optical connector of claim 17, wherein the integrated circuit chip comprises a counter.

19. An optical system, comprising:
a first optical cable;
a first block having a channel for accommodating the first optical cable;
a second optical cable;
a second block having a channel for accommodating the second optical cable such that the second optical cable is in optical communication with the first optical cable;
three spacers, each positioned between the first and second blocks and engaging both blocks when the blocks are pressed against each other by a biasing force in a first direction, the three spacers being positioned and adapted to balance substantially the entire biasing force; and
a plurality of limiters arranged to constrain relative motion between any portion of the first block and any portion of the second block in all directions transverse to the first direction.

20. The optical system of claim 19, wherein each of the three spacers comprises a protrusion extending from either one of the first and second blocks and adapted to be engaged to the other one of the first and second blocks when the blocks are pressed against each other by the biasing force in the first direction.

21. The optical system of claim 20, wherein at least one of the first optical cable and second optical cable passes through one of the protrusions, and the first and second optical cables are substantially aligned along the first direction.

22. A method for coupling optical cables, the method comprising:
securing a first optical cable to a first block;
securing a second optical cable to a second block;
biasing the first block against the second block in a first direction at three locations while engaging an end of the first optical cable to an end of the second optical cable in one of the three locations; and
constraining the relative movement between the first and second blocks in directions transverse to the first direction.

23. The method of claim 22, wherein the biasing step further comprises placing and electrical device in the first block and establishing an detachable electrical contact to the electrical device from the second block.

24. An optical connector, comprising:
a first block having three protrusions;
a second block having three protrusion;
means for securing a first optical cable through one of the protrusions on the first block;
means for securing a second optical cable through one of the protrusions on the second block in optical communication with the first optical cable;
a resilient member adapted to bias the first and second blocks toward each other;
a fastener having a first portion attached to the first block and a second portion attached to the second portion, the two portions being adapted to be connected to each other to maintain the two blocks biased toward each other; and
means for aligning the three protrusions on the first block respectively to the three protrusions on the second block.

25. An optical connector, comprising:
a first block having an opening for accommodating and securing a first optical cable; and
a second block having an opening for accommodating and securing a second optical cable in optical communication with the first optical cable,
the first block and second block being configured to be connected in an essentially kinematic engagement for establishing a stable contact between an end of the first optical cable and an end of the second optical cable.

26. The optical connector of claim 25, further comprising a resilient member adapted to bias the first and second blocks toward each other, thereby maintaining the essentially kinematic engagement.

27. The optical connector of claim 26, wherein the first and second blocks are configured to form a three-footed compressive engagement with each other in a longitudinal direction, the connector further comprising a plurality of limiters arranged to constrain relative motion between any portion of the first block and any portion of the second block in all directions transverse to the longitudinal direction.

* * * * *